Feb. 28, 1933. C. HUFSCHMIDT 1,899,464
POWDERED FUEL FURNACE
Filed July 27, 1927

Inventor:
Carl Hufschmidt
By B. Singer atty.

Patented Feb. 28, 1933

1,899,464

UNITED STATES PATENT OFFICE

CARL HUFSCHMIDT, OF WESTENFELD, NEAR WATTENSCHEID, GERMANY

POWDERED FUEL FURNACE

Application filed July 27, 1927, Serial No. 208,817, and in Germany September 24, 1925.

Application filed for German patent September 24, 1925.

The high temperatures occurring in powdered fuel furnaces are very liable to cause damage to the furnace walls, due to the crushing of over-heated bricks, or buckling. External reinforcement effective for preventing outward buckling is not equally effective for preventing inward buckling.

According to my invention this difficulty is overcome by using a furnace chamber, which is substantially rectangular in plan, but has outwardly curved walls, with a casing surrounding said chamber, and cushions of granular material in the space between the chamber and the walls of the casing.

An embodiment of my invention is shown in the accompanying drawing, in which

Figure 1:
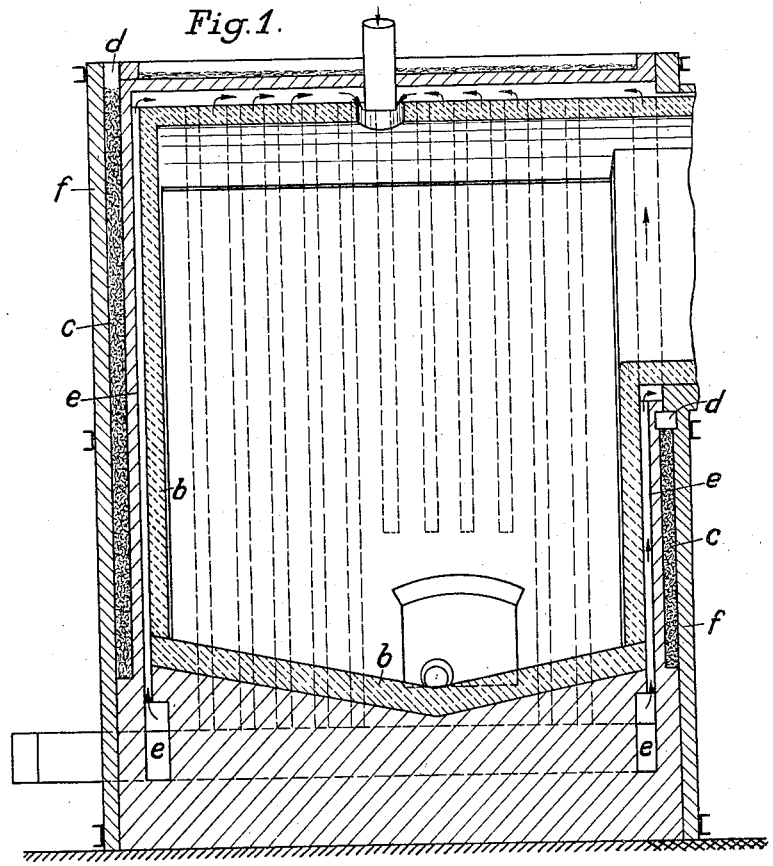

Fig. 1 is a vertical section, and

Figure 2:
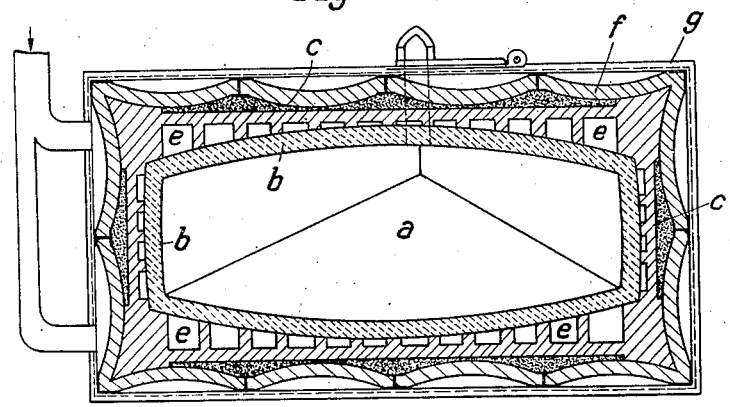

Fig. 2 a horizontal cross-section.

The general outline of the furnace in plan is rectangular, but the longer walls $b$ of the furnace chamber $a$ bulge outwards somewhat, so-called "radial" bricks being used for the construction thereof. These walls are in fact segments of cylinders, their curvature being uniform, so that bricks of uniform size and shape may be used. This outward curvature is very effective in affording resistance to inward crushing of the walls, and also in facilitating expansion of the walls by heat. The chamber $a$ is disposed within a casing $f$, with reinforcing members $g$. The space between the casing and the walls $b$ is in part filled by masonry with air flues $e$, but gaps are left, filled with a granular heat insulating substance such as kieselguhr, forming cushions $c$, which largely absorb the outward thrust of the walls $b$. Air passing through the flues $e$ is used as secondary air for combustion in the furnace, and serves to cool the walls while being preheated for use in the furnace.

What I claim as my invention and desire to secure by Letters Patent of the United States is:—

A furnace of the class described, having a furnace chamber approximately rectangular in plan, said chamber having walls curved outward to permit expansion by heat, a casing surrounding and spaced from the walls of said chamber, cushions of granular heat insulating material in the space between the walls of said chamber and the walls of said casing and serving to prevent deformation of the walls of said chamber, and a masonry structure having air flues therein partly filling the space between said chamber walls and the walls of said casing and leaving gaps in said space, the cushions of granular heat insulating material being located in said gaps.

In witness whereof I have signed this specification.

CARL HUFSCHMIDT.